Oct. 9, 1956          A. G. NILLES          2,765,843
TRUCK COVER
Filed April 5, 1952
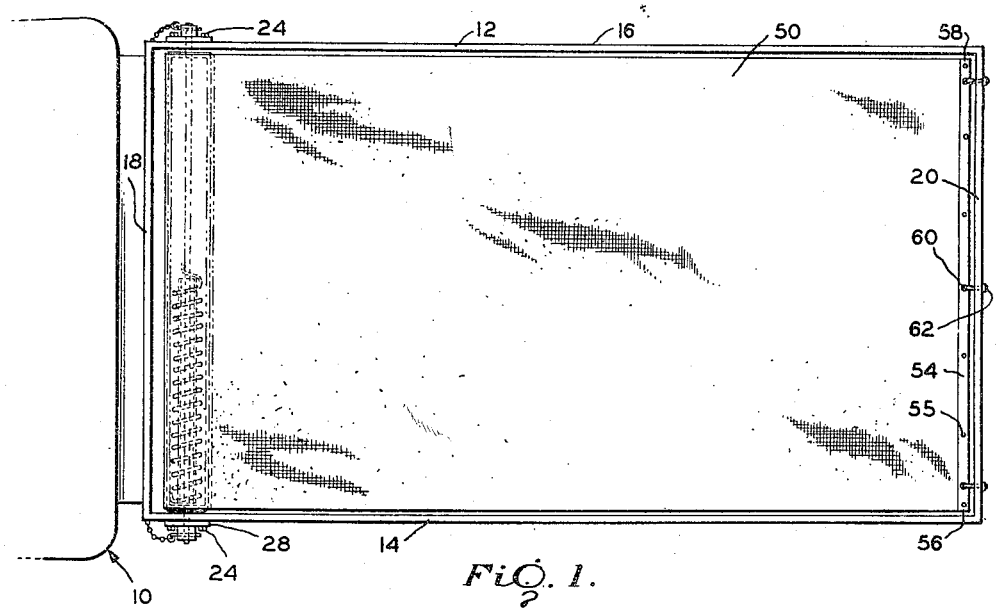
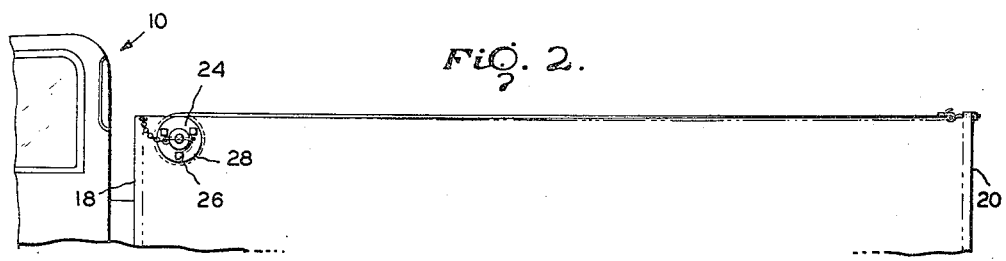
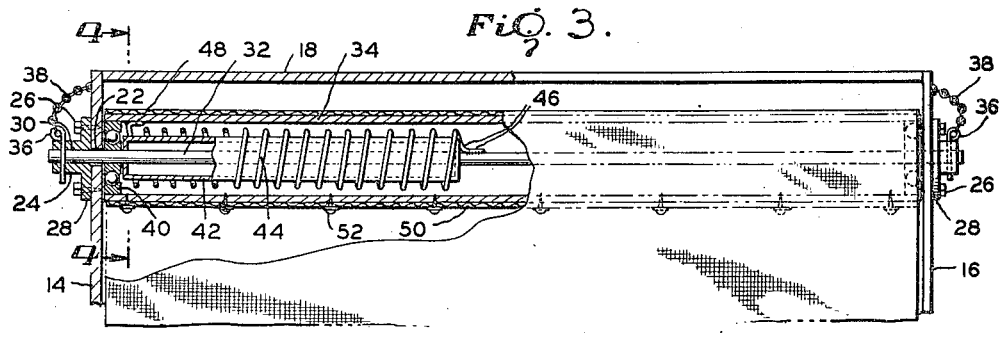
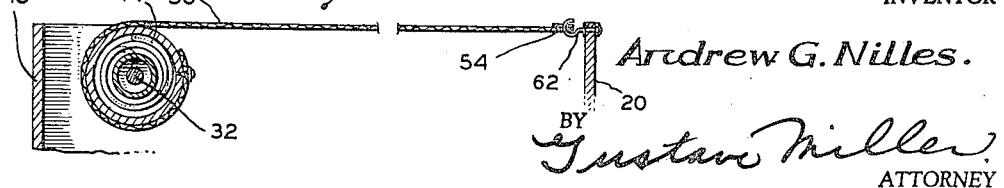
INVENTOR
Andrew G. Nilles.
BY
Gustav Miller
ATTORNEY

United States Patent Office 2,765,843
Patented Oct. 9, 1956

2,765,843

TRUCK COVER

Andrew G. Nilles, Mansfield, Wash.

Application April 5, 1954, Serial No. 421,069

1 Claim. (Cl. 160—290)

This invention relates to a cover for a truck or similar vehicle, and particularly relates to a flexible cover adapted to be mounted on a truck having an open top in such a manner that it may be easily moved to either open or close the truck. The cover embodying this invention is particularly adapted for trucks which are used to carry wheat or other grains in bulk, the cover being provided for the purpose of preventing the grain from blowing out of the truck, particularly while it is in motion. This cover may, however, be used for any open vehicle or even for stationary open-topped receptacles.

More specifically, the present invention contemplates the provision of a spring roller which is adapted to be mounted directly on the body frame of an open topped truck. The roller is mounted adjacent the upper front interior portion of the body frame and is connected to one end of a flexible sheet having a width which is substantially that of the body frame interior. At its opposite end, the sheet is provided with a stiffening means and also with means to releasably connect the end of the sheet to the rear wall of the body frame. The spring roller urges the cover sheet into a rolled up position whereby the truck is normally kept open. When the sheet is pulled out, and is connected to the rear wall of the frame, it acts as a complete covering for the vehicle. When the sheet is released from its connection to the rear wall, it is automatically rolled up on the roller by the biasing action of the spring.

Heretofore, vehicle body covers of this general type have been designed which also used the concept of flexible covers attached to spring rollers. However, such other cover devices all required complex and costly auxiliary frameworks to which the cover and its associated parts were affixed. It was necessary to attach these heavy and cumbersome auxiliary frameworks at an expenditure of much time and effort, and if any of the parts became damaged or, for other reasons, had to be repaired or replaced, it was generally necessary to completely disassemble the framework in order to make the repairs or replacements. If the mechanism was greatly damaged or if it was necessary to replace the whole framework, more time, labor and expense were involved. Furthermore, these prior art structures were difficult and expensive to manufacture, thereby increasing their initial cost to the consumer. On the whole, these prior art devices were so expensive to make and so difficult to install and maintain, that many potential users who would have been delighted to have such a cover device could not afford to buy it.

The above disadvantages have been successfully overcome by the present invention wherein the primary object is to provide a cover for open vehicles which is simple in construction and which may easily be installed on any type of open truck or similar open vehicle.

Another object of this invention is to provide a flexible cover for open vehicles which requires no complex and expensive auxiliary framework and which is easy and inexpensive to maintain.

Other objects of this invention are to provide an improved cover for open vehicles that is easily and economically produced, which, although simple in structure, is sturdy in construction, and which is highly efficient in operation.

With the above and related objects in view, this invention consists in the details of construction and combination of parts, as will be more fully understood from the following description when read in conjunction with the accompanying drawing, in which:

Fig. 1 is a top plan view of a truck showing the cover in its open position wherein it acts to close the top of the open truck;

Fig. 2 is a side elevational view of a truck showing the cover in truck closing position;

Fig. 3 is an enlarged detail top view partly in elevation and partly in section, showing the construction of the spring roller;

Fig. 4 is an enlarged fragmentary vertical sectional view of the roller, cover and tail bar fastening means as seen substantially on line 4—4 of Fig. 3.

Referring now in greater detail to the drawing, wherein similar reference characters refer to similar parts, there is shown a truck, generally designated 10, having a body 12 consisting of a pair of side walls 14 and 16, a pair of front and rear end walls 18 and 20 and a bottom wall, not shown.

An opening 22 is formed in each of the side walls 14 and 16 adjacent the front upper end of the truck body. These openings 22 may be drilled, bored or the like, at the time of installing the cover device. Brackets 24 are attached to the walls 14 and 16 by means of screws, bolts or the like, indicated at 26, which are inserted through appropriate openings in a flange 28 provided on each of the brackets 24. These brackets are positioned on the outside of the truck body in such a manner that the longitudinal bore 30 of the brackets coincides with the opening 22.

Extending through the brackets 24 are the ends of a rod 32 upon which is rotatably mounted a tubular roller 34 positioned within the interior of the body 12 between the walls 14 and 16. The rod 32 is held fixed within the bore 30 of each bracket 24 by a locking pin or the like, such as indicated at 36, this locking pin being inserted through coinciding radial bores formed in both the bracket and the rod. This locking pin may be connected to the truck body by a chain or the like indicated at 38 so that when the pin is removed from the bracket during installation or removal of the rod, the pin will not be mislaid.

The tubular roller 34 is rotatably mounted on the rod 32 by means of oil seal ball bearings 40 at either end of the roller. A tubular bushing 42 is mounted on the rod 32 within the roller 34, and on this bushing 42 is provided a torsion spring 44, one end of which is connected to the rod at 46 as by welding, soldering or the like, and the other end of which is connected to the inner wall of the tubular roller at 48, also as by welding, soldering or the like. Bushing 42 serves to preclude the undue distortion of spring 44 by too tight engagement about rod 32 when roller 48 is rotated to tension the spring for a purpose to be more fully described hereinafter.

A sheet 50, preferably made of canvas but which may also be made of wool, cotton or other textiles, or of plastic, rubber or any other flexible material, even including flexible metal, is attached, at one end, to the roller 34 as by screws, bolts or the like, as indicated at 52. It is also within the scope of the invention to attach the sheet to the roller by means of nails, pins, adhesives or, in the case of such materials as rubber, by vulcanizing. At the opposite end of the sheet is provided a rigid tail bar made of metal or other substantially rigid material. This tail bar 54, which is connected to the sheet as by rivets 55 or the like, extends to the edges of the sheet as indicated at 56 and 58. The tail bar is provided for the purpose of keeping the sheet taut. A series of spaced openings 60 are provided in the bar 54, these openings being adapted to receive hooks 62 connected to the end wall 20 adjacent the top thereof.

The bar 54 is adapted to rest on top of the grain and to keep the cover sheet 50 seated over the truck's open top.

It is therefore obvious that this construction obviates the need for any complicated, bulky and expensive auxiliary equipment, since all that is necessary to install this cover device is to bore or drill a hole in each of the side walls of the body frame, connect the brackets 24 to the outside of the body frame with the center longitudinal bore of each bracket in line with its corresponding hole, and spread the side wall slightly apart to install the spring roller which is connected to the sheet within the body frame, with the shaft 32 fixed within the brackets. The movable cover is then in full operative condition.

Although this invention has been described in considerable detail, such description is intended as being illustrative rather than limiting since the invention may be variously embodied, and the scope of the invention is to be determined as claimed.

What is claimed as the invention is:

A cover device for open top vehicles comprising a spring roller, said roller having portions adapted to be rotatably mounted between the side walls of said body adjacent one end thereof, said roller comprising a shaft of greater width than said body, the ends of said shaft extending through openings in said side walls, removable pin means in the extending ends of said shaft, means connecting said pin means to the outer side of said body to preclude rotation of said shaft, a tubular member rotatably mounted on said shaft between said side walls by means of a pair of oil seal roller bearings, each positioned adjacent one end of said tubular member, a bushing fixedly mounted on said shaft within said tubular member, a coil spring surrounding said bushing, said spring being connected at one end to said shaft and at its other end to the inner wall of said tubular member, a flexible sheet connected at one end to said tubular member, a rigid bar fixed to said sheet at the opposite end thereof, said roller and said sheet having a width substantially equal to the width of the body frame to which they are to be applied, said bar extending at least to the side edges of said sheet and means on said bar for releasably securing it to the rear wall of said body to secure said sheet in body covering position.

References Cited in the file of this patent

UNITED STATES PATENTS

| | | |
|---|---|---|
| 1,164,385 | Neupauer | Dec. 14, 1915 |
| 1,258,366 | Simonton | Mar. 5, 1918 |
| 1,878,710 | Watson | Sept. 20, 1932 |
| 2,213,601 | White | Sept. 3, 1940 |